Dec. 23, 1969 A. G. F. DINGWALL 3,485,679

THERMOELECTRIC DEVICE WITH EMBOSSED GRAPHITE MEMBER

Filed Oct. 23, 1965

Inventor:
ANDREW G.F. DINGWALL

BY Glenn A. Brunette
Attorney

United States Patent Office 3,485,679
Patented Dec. 23, 1969

3,485,679

THERMOELECTRIC DEVICE WITH EMBOSSED GRAPHITE MEMBER

Andrew G. F. Dingwall, Cedar Grove, N.J., assignor to RCA Corporation, a corporation of Delaware Filed Oct. 23, 1965, Ser. No. 502,947
Int. Cl. H01v 1/30
U.S. Cl. 136—205 2 Claims

ABSTRACT OF THE DISCLOSURE

A thermoelectric generator in which a graphite member is used between the thermoelements and the coupling strap. The graphite member is embossed in order to improve its ability to absorb the mismatched thermal expansion stresses of the thermoelemenets and coupling strap and thereby prevent cracking of the thermoelements.

This invention relates to thermoelectric devices, and particularly to the joint between the thermoelements and the hot strap used in certain types of thermoelectric devices.

Thermoelectric devices operating in accordance with the Seebeck effect comprise a pair of opposite conductivity-type thermoelements each having a "hot" end and a "cold" end. The hot ends of the thermoelements are connected by a "hot strap." Heat is applied to the hot ends of the thermoelements and the hot strap and the cold ends are cooled. A voltage is thus provided between the cold ends of the device.

One problem of the prior art is that, in some instances, the thermal expansion mismatch between the thermoelements and hot strap is so great that cracking of the thermoelement or hot strap occurs due to thermal expansion mismatch stresses. Because of this, certain combinations of hot strap and thermoelectric materials which would provide thermoelectric devices having increased efficiency and power output have been heretofore impractical.

An object of this invention is to provide novel and improved thermoelectric devices of the type described having higher efficiency and power output than prior available thermoelectric devices.

A further object of this invention is to provide thermoelectric devices of the type described using heretofore impractical combinations of hot strap and thermoelement materials.

For achieving these objects, the hot strap of the thermoelectric device is made to include a graphite member which is in contact with a thermoelement of the device and which has at least one surface thereof embossed. The embossed surface may be provided, for example, by the use of a punch and die set, or by machining the pattern using a fine cutting wheel.

Figure 1:
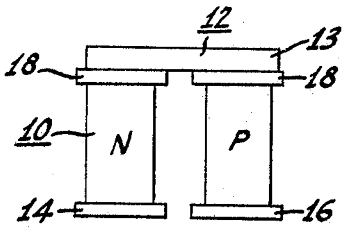
FIG. 1 is a side elevation of a thermoelectric generator.

The thermoelectric device or generator 10 shown in FIG. 1 comprises N type and P type thermoelements N and P, respectively. Extending between and bonded to what is to become the hot ends of the thermoelements N and P of the generator 10, is a hot strap 12. A pair of metal shoes 14 and 16 are fixed to what is to become the cold ends of the thermoelements N and P by any suitable bonding technique. For example, the shoes can be brazed to the cold ends of the thermoelements with copper or a noble metal or an alloy of noble metals.

The thermoelements N and P may be any one of numerous materials useful as thermoelements. One group of such materials, for example, are alloys of silicon and germanium including, preferably, a doping agent. The silicon-germanium alloys may be either polycrystalline or monocrystalline. P type silicon-germanium alloys can be provided by doping the alloy with an electron acceptor element such as boron, aluminum, or gallium from Group III–B of the Chemical Periodic Table. N type silicon-germanium alloys can be provided by doping the alloy with an electron donor element such as phosphorus or arsenic from Group VB of the Chemical Periodic Table.

Other thermoelectric materials, by way of further example, comprise what are referred to as III–V compounds, that is, one or more compounds comprising an element from Group III of the Chemical Periodic Table and an element from Group V of the Chemical Periodic Table. An example of such a compound is indium arsenide-gallium arsenide comprising, by weight, 65% InAs–35% GaAs. N type indium arsenide-gallium arsenide thermoelements are obtained by doping the compound with selenium. In a thermoelectric device, an N type indium arsenide-gallium arsenide thermoelement can be paired with a P type thermoelement of another thermoelectric material, such as the aforementioned silicon-germanium allows.

In the operation of the generator 10, heat is applied to the hot strap 12 by any suitable means, such as by radiation. The temperature of the applied heat can be almost as high as the melting point of the materials in the hot end of the generator. The metal shoes 14 and 16 are maintained at a temperature lower than the temperature of the hot end of the generator. Under these conditions, a Seebeck voltage is generated between the shoes 14 and 16, the amplitude of the voltage being dependent upon, among other things, the temperature difference between the hot and cold ends of the generator.

The hot strap 12 of the generator 10 comprises a high thermal and electrical conductivity refractory material plate 13 such as tungsten, tungsten carbide, or molybdenum, and graphite shims or wafers 18. The wafers 18 are disposed between the plate 13 and the ends of the thermoelements N and P. Preferably, the wafers correspond in shape to the cross section of the thermoelements N and P.

Figure 2:
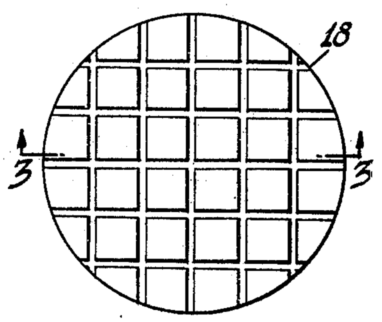
FIG. 2 is a plan view, on an enlarged scale, of the graphite wafer used in the generator shown in FIG. 1, said wafer having been embossed with a cutting wheel.

One major surface of each wafer 18 as embossed, that is, it has a raised or relief surface pattern. As shown in FIG. 2, a simple rectangular cross-hatched pattern may be used. Other patterns may also be used. Known means may be used for embossing the graphite surface. For example, the pattern shown in FIG. 2 may be formed by cutting a plurality of grooves 19 (FIG. 3) into the surface of the wafer using a fine cutting tool.

Figure 4:
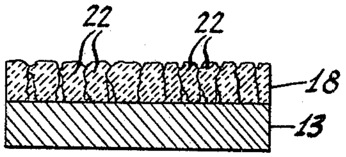
FIG. 4 is a view similar to FIG. 3 but showing a wafer which has been mounted on a back-up plate and which has been punch-embossed.

A preferred method of embossing the wafers 18 is to punch the pattern using a punch and die set. A hardened steel die having the desired pattern machined into its face may be used with pressures in the order of 5,000 lbs./square inch. It is generally desirable to use thin wafers, in the range of 0.025–0.05 inch thickness, in the generator 10. To prevent cracking of the thin wafers during the punching operation, it is preferable to bond the wafers 18 to the refractory material plate 13 prior to the embossing operation. An embossed wafer-refractory plate assembly is illustrated in FIG. 4.

Figure 3:
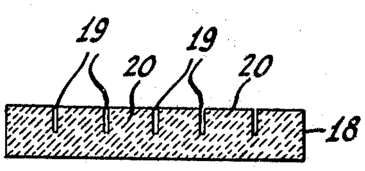
FIG. 3 is a section along line 3—3 of FIG. 2.

It is found that the effective moduls of elasticity of the graphite wafers, hence their ability to absorb and obstruct the transmission of stress, is improved by a factor as high as 50 by the embossing operation. This occurs because the embossing provides large numbers of cantilever arms in the graphite wafer which readily flex or yield upon the application of stress thereto. That is, as shown in FIG. 3, for example, slicing or cutting the wafer produces the cantilever arms 20. Punch-embossing the wafers produces microscopic cracks spreading from the troughs of the relief pattern, as shown in FIG. 4, thereby also forming a plurality of cantilever arms 22.

In general, the greater the number of cantilever arms per unit area of graphite, and the more slender the arms, the greater is the ability of the graphite wafers to absorb stress.

The graphite wafers 18 may be bonded to the plate 13 and to the thermoelements N and P in known manner. By way of example, a preferred method of preparing and bonding the graphite wafers 18 to silicon-germanium alloy thermoelements N and P and to a tungsten plate 13 is described. The silicon-germanium alloy may comprise, by atomic percent, 85% silicon and 15% germanium. A thin layer of tungsten, in the order of 0.0005 inch thickness, is first vapor deposited onto one surface of the wafer 18. The opposite surface of the graphite wafer is then siliconized by applying a thin layer of powdered silicon onto the surface and firing the silicon at a temperature somewhat above its melting point, e.g. around 1500° C. The tungsten plate 13 is then brazed to the tungsten coated surface of the graphite water, in vacuum, using a nickel-titanium braze at 1050° C. An alternative procedure is to braze the graphite wafer 18 to the tungsten plate 13 with a 50–50 titanium-zirconium braze at 1650° C. in vacuum. When this alternate procedure is used, the siliconizing step of the graphite wafer is preferably performed after the tungsten plate 13 and the graphite wafers 18 are brazed together. The siliconized surface of the graphite wafer is then embosesd, preferably by the punch method described. In instances, as shown in FIG. 1, for example, wherein portions of the graphite wafer 18 extend beyond the edges of the tungsten plate 13, it is generally preferable to emboss only the area of the graphite wafer backed-up by the tungsten plate in order to prevent cracking of the wafer. The embossed-siliconized surface of the graphite wafer 18 is then diffusion bonded to the ends of the thermoelements N and P. This is done, preferably in a 0.1 atmosphere of dry helium, using a compression of around 25 lbs./square inch, and heating the parts to a temperature near the solidus temperature of the silicon-germanium alloy, e.g. around 1305° C., for approximately 2½ minutes. The purpose of the tungsten surface on the graphite wafer is to provide an improved braze between the graphite and the tungsten, and to prevent penetration of the braze material through the graphite wafer during the bonding operation. The silicon surface on the graphite wafer improves the wettability of the graphite by the silicon-germanium alloy.

It is noted that, heretofore, because of excessive thermal expansion mismatch, it has not been generally feasible to fabricate thermoelectric devices comprising 85% silicon-15% germanium alloy thermoelements and tungsten hot straps. This combination, as well as other combinations of thermoelement and hot strap materials made possible by this invention, results in thermoelectric devices having improved characteristics such as higher efficiency and high power output.

Figure 5:
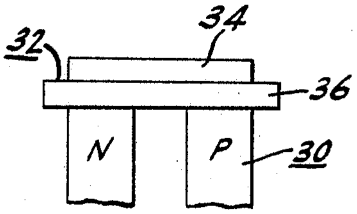
FIGS. 5 and 6 are side elevations, partly broken away, of modifications of the generator shown in FIG. 1.

The thermoelectric device 30, shown in FIG. 5, comprises N type and P type thermoelements N and P, respectively and a two layered hot strap 32. Although not shown, the remainder or cold end of the generator is similar to the cold end of the generator 10 shown in FIG. 1.

The layer 34 of the hot strap 32 is a plate of a high thermal and electrical conductivity refractory material such as tungsten, tungsten carbide, or molybdenum. The layer 36 is a plate of graphite. The graphite plate 36 is bonded to the thermoelements N and P, and the refractory material plate 34 is bonded to the graphite plate 36. Preferably, the portions of the graphite plate 36 bonded to the thermoelements N and P are embossed. Alternatively, however, the surface of the graphite plate 36 bonded to the refractory material plate 34, may be embossed, or both major surfaces of the graphite wafer 36 may be embossed. The embossing of the graphite plate 36 may be accomplished as described above.

The bonding of the graphite plate 36 to the thermoelements N and P and to the refractory material plate 34 may be done by presently known processes. It is noted, by way of example, however, that the graphite plate 36 may be prepared and bonded to a tungsten plate 34 and to 85% silicon-15% germanium alloy, by atomic percent, thermoelements N and P in the same manner as described in connection with the bonding of the wafers 18 to the tungsten plate 13 and thermoelements N and P of 85% silicon-15% germanium alloy.

Figure 6:
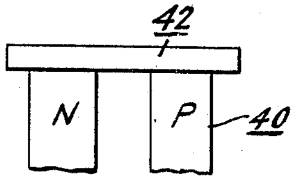

The thermoelectric device 40, shown in FIG. 6, comprises N type and P type thermoelements N and P, respectively, and a hot strap 42. The remainder or cold end of the generator 40 is similar to the cold end of the device 10 shown in FIG. 1. The hot strap 42 of the generator 40 is made of graphite. At least one of the major surfaces of the strap 42 is embossed to absorb thermal expansion stresses, as hereinbefore described.

The graphite hot strap 42 may be bonded to the thermoelements N and P in known manner. For example, for bonding the graphite hot strap 42 to 85% silicon-15% germanium alloy, by atomic percent, thermoelements N and P, the embossed surface of the graphite is siliconized. The siliconized graphite surface is then diffusion bonded to the ends of the thermoelements N and P by assembling the parts in a fixture designed to provide bonding pressures of around 25 lbs./square inch, and heating the assembled parts in vacuum for about 2½ minutes at the solidus temperature of the silicon-germanium alloy, e.g. around 1305° C.

It is noted that not all grades of graphite are equally suitable for use in the thermoelectric devices of the type described. Commercially available graphite is, for example, available in several hundred grades varying in such characteristics as electrical and thermal resistances, density, mechanical strength, coefficient of thermal expansion, and the like. Generally, for minimizing electrical and thermal losses in the graphite members used in thermoelectric devices, grades of graphite having low electrical and thermal resistivities in a direction parallel to the direction of current and heat flow through the graphite members are preferred. Certain commercially used graphite additives are generally desirable. Zirconium boride additions, for example, tend to lower the thermal and electrical resistivities of graphite and are particularly suitable for bonds to boron-doped P type silicon-germanium alloys. Silicon-containing graphites are readily bonded to silicon-germanium alloy thermoelements without the use of a separate siliconizing step. Also, although graphite is highly compliant, and even more so when embossed, it is generally preferred that the coefficient of thermal expansion of the grade of graphite utilized is as closely matched as possible to the coefficient of thermal expansion of the materials to which it is bonded. With thermoelectric devices having hot straps comprising tungsten, and thermoelements of 85% silicon-15% germanium, for example, grade 886–S graphite manufactured by Speer Carbon Company is satisfactory.

Although it is generally preferable to emboss the surface of the graphite members bonded to the thermoelements, the opposite surface of the graphite members may be embossed instead. Also, in some instances, both surfaces may be embossed.

What is claimed is:

1. A thermoelectric generator comprising a pair of thermoelements of opposite conductivity type and a hot strap including a graphite member bonded at one of its surfaces to one of said thermoelements, at least one of the surfaces of said graphite member being embossed wherein said one thermoelement comprises a doped alloy of silicon and germanium and wherein said hot strap further includes a plate of tungsten disposed in contact with said graphite member on the side thereof remote from said one thermoelement.

2. A thermoelectric generator comprising a pair of thermoelements of opposite conductivity type and a hot strap connecting said thermoelements, said hot strap comprising two layers, one of said layers being of a high thermal and electrical conductivity refractory material, and the other layer being of graphite, a surface of said graphite layer being embossed, and said graphite layer being disposed between and bonded to said refractory material layer and said thermoelements, wherein said thermoelements comprise doped alloys of silicon and germanium, and said refractory material is tungsten.

References Cited

UNITED STATES PATENTS

| | | | |
|---|---|---|---|
| 2,946,835 | 7/1960 | Westbrook et al. | 136—239 |
| 3,075,360 | 1/1963 | Elfving et al. | 136—237 X |
| 3,079,455 | 2/1963 | Haba | 136—237 |
| 3,285,017 | 11/1966 | Henderson et al. | 136—239 X |
| 3,330,703 | 7/1967 | Podolsky | 136—239 |
| 3,338,753 | 8/1967 | Horsting | 136—239 X |

ALLEN B. CURTIS, Primary Examiner

U.S. Cl. X.R.

136—237